(12) United States Patent
Shi et al.

(10) Patent No.: US 10,865,218 B2
(45) Date of Patent: Dec. 15, 2020

(54) FLUORIDE FLUORESCENCE PROBE

(71) Applicant: The Procter & Gamble Company, Cincinnati, OH (US)

(72) Inventors: Yunming Shi, Beijing (CN); Ross Strand, Singapore (SG); Tao Yi, Shanghai (CN); Peng Wei, Shanghai (CN); FengFeng Xue, Shanghai (CN)

(73) Assignee: The Procter & Gamble Company, Cincinnati, OH (US)

( * ) Notice: Subject to any disclaimer, the term of this patent is extended or adjusted under 35 U.S.C. 154(b) by 180 days.

(21) Appl. No.: 16/005,817

(22) Filed: Jun. 12, 2018

(65) Prior Publication Data
US 2018/0370996 A1 Dec. 27, 2018

(30) Foreign Application Priority Data

Jun. 22, 2017 (WO) ................ PCT/CN2017/089471

(51) Int. Cl.
*C07F 7/18* (2006.01)
*G01N 21/64* (2006.01)
*G01N 31/22* (2006.01)

(52) U.S. Cl.
CPC ......... *C07F 7/1804* (2013.01); *G01N 21/643* (2013.01); *G01N 31/22* (2013.01); *G01N 2021/6439* (2013.01)

(58) Field of Classification Search
CPC ...................................... C07F 7/1804
USPC ...................................... 514/266.2
See application file for complete search history.

(56) References Cited

FOREIGN PATENT DOCUMENTS

JP    2003277368    10/2003

OTHER PUBLICATIONS

Jun Feng Zhang, Chang Su Lim, Sankarprasad Bhuniya, Bong Rae Cho, Jong Seung Kim, "A Highly Selective Colorimetric and Ratiometric Two-Photon Fluorescent Probe for Fluoride Ion Detection", Department of Chemistry, Korea University, Seoul 130-701, Korea, College of Chemistry and Chemical Engineering, Yunnan Normal University, Kunming, 650092, P.R. China, 15 pages.
Jungeun Baea, Louis E. McNamarab, Manal A. Naelc, Fakhri Mahdid, Robert J. Doerksenc, Gene L. Bidwell IIId, Nathan I. Hammerb and Seongbong Jo, "Nitroreductase-Triggered Activation of a Novel Caged Flourescent Probe Obtained From Methylene Blue", Electronic Supplementary Material (ESI) for ChemComm. This journal is © The Royal Society of Chemistry 2015.

*Primary Examiner* — Kahsay Habte
(74) *Attorney, Agent, or Firm* — Jason J. Camp

(57) ABSTRACT

Methylene blue (MB) derivatives selectively detect $F^-$ by desilylation reaction to act as a fluorescent probe.

3 Claims, 14 Drawing Sheets

| No. | Chemical structure | Name / formula / MW |
|---|---|---|
| R1 | | 4-((tert-butyldiphenylsilyl)oxy)benzyl 3,7-bis(dimethylamino)-10H-phenothiazine-10-carboxylate<br>Chemical Formula: C40H43N3O3SSi<br>Molecular Weight: 673.95 |
| R2 | | 4-((triisopropylsilyl)oxy)benzyl 3,7-bis(dimethylamino)-10H-phenothiazine-10-carboxylate<br>Chemical Formula: C33H45N3O3SSi<br>Molecular Weight: 591.89 |
| R3 | | 4-((tert-butyldimethylsilyl)oxy)benzyl 3,7-bis(dimethylamino)-10H-phenothiazine-10-carboxylate<br>Chemical Formula: C30H39N3O3SSi<br>Molecular Weight: 549.81 |
| 4 | | 4-((trimethylsilyl)oxy)benzyl 3,7-bis(dimethylamino)-10H-phenothiazine-10-carboxylate<br>Chemical Formula: C27H33N3O3SSi<br>Molecular Weight: 507.72 |
| 5 | | 4-((tri-tert-butylsilyl)oxy)benzyl 3,7-bis(dimethylamino)-10H-phenothiazine-10-carboxylate<br>Chemical Formula: C36H51N3O3SSi<br>Molecular Weight: 633.97 |
| 6 | | 4-((triethylsilyl)oxy)benzyl 3,7-bis(dimethylamino)-10H-phenothiazine-10-carboxylate<br>Chemical Formula: C30H39N3O3SSi<br>Molecular Weight: 549.81 |

FIG. 9

| | | |
|---|---|---|
| 7 | | 3,5-dimethyl-4-((trimethylsilyl)oxy)benzyl 3,7-bis(dimethylamino)-10H-phenothiazine-10-carboxylate<br>Chemical Formula: C29H37N3O3SSi<br>Molecular Weight: 535.78 |
| 8 | | 4-((triphenylsilyl)oxy)benzyl 3,7-bis(dimethylamino)-10H-phenothiazine-10-carboxylate<br>Chemical Formula: C42H39N3O3SSi<br>Molecular Weight: 693.94 |
| 9 | | 4-((methyldiphenylsilyl)oxy)benzyl 3,7-bis(dimethylamino)-10H-phenothiazine-10-carboxylate<br>Chemical Formula: C37H37N3O3SSi<br>Molecular Weight: 631.87 |
| 10 | | 4-((diisopropyl(phenyl)silyl)oxy)benzyl 3,7-bis(dimethylamino)-10H-phenothiazine-10-carboxylate<br>Chemical Formula: C36H43N3O3SSi<br>Molecular Weight: 625.90 |
| 11 | | 3-((tert-butyldimethylsilyl)oxy)benzyl 3,7-bis(dimethylamino)-10H-phenothiazine-10-carboxylate<br>Chemical Formula: C30H39N3O3SSi<br>Molecular Weight: 549.81 |
| | | |

FIG. 10

| | | |
|---|---|---|
| 12 | | 4-((tert-butyldiphenylsilyl)oxy)benzyl 3,7-bis(diethylamino)-10H-phenothiazine-10-carboxylate<br>Chemical Formula: C44H51N3O3SSi<br>Molecular Weight: 730.06 |
| 13 | | 4-((tert-butyldiphenylsilyl)oxy)benzyl 3,7-bis(dimethylamino)-2,8-dimethyl-10H-phenothiazine-10-carboxylate<br>Chemical Formula: C42H47N3O3SSi<br>Molecular Weight: 702.00 |
| 14 | | 4-((tert-butyldiphenylsilyl)oxy)benzyl 3,7-bis(ethylamino)-2,8-dimethyl-10H-phenothiazine-10-carboxylate<br>Chemical Formula: C42H47N3O3SSi<br>Molecular Weight: 702.00 |
| 15 | | 4-((tert-butyldiphenylsilyl)oxy)benzyl 3,7-di(pyrrolidin-1-yl)-10H-phenothiazine-10-carboxylate<br>Chemical Formula: C44H47N3O3SSi<br>Molecular Weight: 726.02 |
| 16 | | 4-((tert-butyldiphenylsilyl)oxy)benzyl 3,7-di(piperidin-1-yl)-10H-phenothiazine-10-carboxylate<br>Chemical Formula: C46H51N3O3SSi<br>Molecular Weight: 754.08 |

FIG. 11

| 17 | 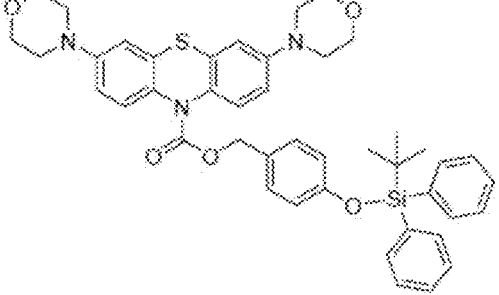 | 4-((tert-butyldiphenylsilyl)oxy)benzyl 3,7-dimorpholino-10H-phenothiazine-10-carboxylate<br>Chemical Formula: C44H47N3O5SSi<br>Molecular Weight: 758.02 |
|---|---|---|
| 18 | 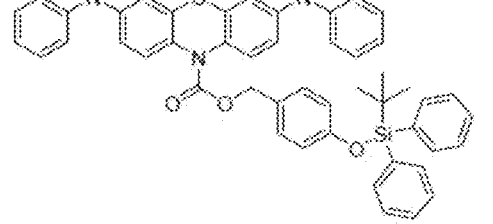 | 4-((tert-butyldiphenylsilyl)oxy)benzyl 3,7-bis(phenylamino)-10H-phenothiazine-10-carboxylate<br>Chemical Formula: C48H43N3O3SSi<br>Molecular Weight: 770.04 |
| 19 | 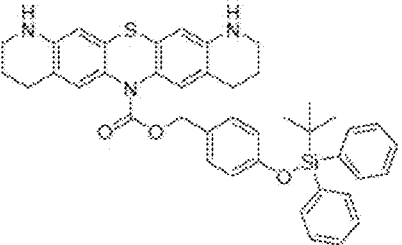 | 4-((tert-butyldiphenylsilyl)oxy)benzyl 1,2,3,4,8,9,10,11-octahydro-6H-dipyrido[3,2-b:2',3'-i]phenothiazine-6-carboxylate<br>Chemical Formula: C42H43N3O3SSi<br>Molecular Weight: 697.97 |
| 20 | 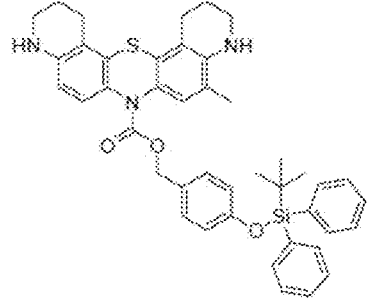 | 4-((tert-butyldiphenylsilyl)oxy)benzyl 5-methyl-1,2,3,4,10,11,12,13-octahydro-7H-dipyrido[2,3-c:3',2'-h]phenothiazine-7-carboxylate<br>Chemical Formula: C43H45N3O3SSi<br>Molecular Weight: 712.00 |
| 21 | 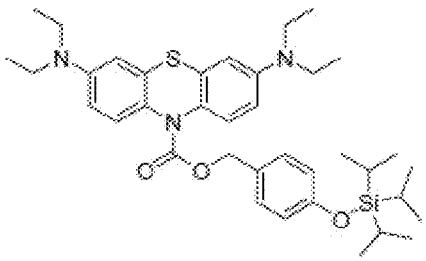 | 4-((triisopropylsilyl)oxy)benzyl 3,7-bis(diethylamino)-10H-phenothiazine-10-carboxylate<br>Chemical Formula: C37H53N3O3SSi<br>Molecular Weight: 647.99 |

FIG. 12

| | | |
|---|---|---|
| 22 | | 4-((triisopropylsilyl)oxy)benzyl 3,7-bis(dimethylamino)-2,8-dimethyl-10H-phenothiazine-10-carboxylate<br>Chemical Formula: C35H49N3O3SSi<br>Molecular Weight: 619.94 |
| 23 | | 4-((triisopropylsilyl)oxy)benzyl 3,7-bis(ethylamino)-2,8-dimethyl-10H-phenothiazine-10-carboxylate<br>Chemical Formula: C35H49N3O3SSi<br>Molecular Weight: 619.94 |
| 24 | | 4-((triisopropylsilyl)oxy)benzyl 3,7-di(pyrrolidin-1-yl)-10H-phenothiazine-10-carboxylate<br>Chemical Formula: C37H49N3O3SSi<br>Molecular Weight: 643.96 |
| 25 | | 4-((triisopropylsilyl)oxy)benzyl 3,7-di(piperidin-1-yl)-10H-phenothiazine-10-carboxylate<br>Chemical Formula: C39H53N3O3SSi<br>Molecular Weight: 672.02 |
| 26 | | 4-((triisopropylsilyl)oxy)benzyl 3,7-dimorpholino-10H-phenothiazine-10-carboxylate<br>Chemical Formula: C37H49N3O5SSi<br>Molecular Weight: 675.96 |
| 27 | | 4-((triisopropylsilyl)oxy)benzyl 3,7-bis(phenylamino)-10H-phenothiazine-10-carboxylate<br>Chemical Formula: C41H45N3O3SSi<br>Molecular Weight: 687.97 |

FIG. 13

| 28 | 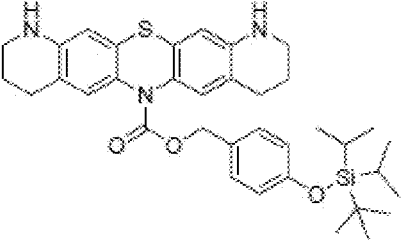 | 4-((tert-butyldiisopropylsilyl)oxy)benzyl 1,2,3,4,8,9,10,11-octahydro-6H-dipyrido[3,2-b:2',3'-i]phenothiazine-6-carboxylate<br>Chemical Formula: C36H47N3O3SSi<br>Molecular Weight: 629.94 |
| 29 | 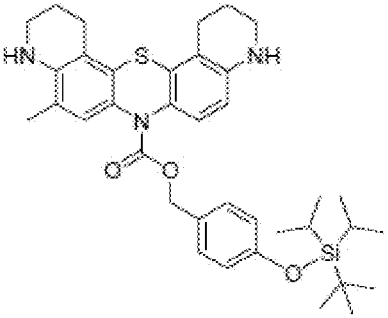 | 4-((tert-butyldiisopropylsilyl)oxy)benzyl 5-methyl-1,2,3,4,10,11,12,13-octahydro-7H-dipyrido[2,3-c:3',2'-h]phenothiazine-7-carboxylate<br>Chemical Formula: C37H49N3O3SSi<br>Molecular Weight: 643.96 |
| 30 | 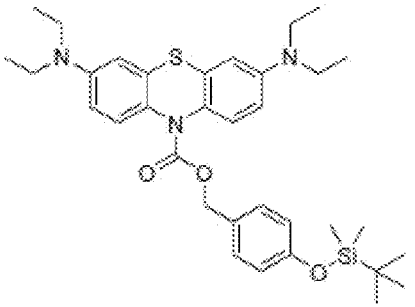 | 4-((tert-butyldimethylsilyl)oxy)benzyl 3,7-bis(diethylamino)-10H-phenothiazine-10-carboxylate<br>Chemical Formula: C34H47N3O3SSi<br>Molecular Weight: 605.91 |
| 31 | 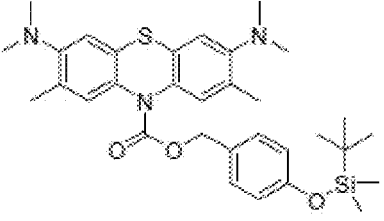 | 4-((tert-butyldimethylsilyl)oxy)benzyl 3,7-bis(dimethylamino)-2,8-dimethyl-10H-phenothiazine-10-carboxylate<br>Chemical Formula: C32H43N3O3SSi<br>Molecular Weight: 577.86 |
| 32 | 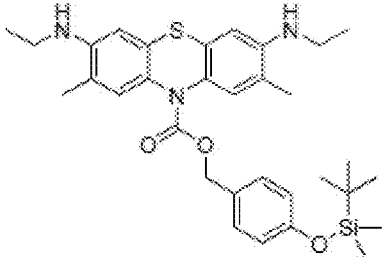 | 4-((tert-butyldimethylsilyl)oxy)benzyl 3,7-bis(ethylamino)-2,8-dimethyl-10H-phenothiazine-10-carboxylate<br>Chemical Formula: C32H43N3O3SSi<br>Molecular Weight: 577.86 |

FIG. 14

| 33 | | 4-((tert-butyldimethylsilyl)oxy)benzyl 3,7-di(pyrrolidin-1-yl)-10H-phenothiazine-10-carboxylate<br>Chemical Formula: C34H43N3O3SSi<br>Molecular Weight: 601.88 |
|---|---|---|
| 34 | | 4-((tert-butyldimethylsilyl)oxy)benzyl 3,7-di(piperidin-1-yl)-10H-phenothiazine-10-carboxylate<br>Chemical Formula: C36H47N3O3SSi<br>Molecular Weight: 629.94 |
| 35 | | 4-((tert-butyldimethylsilyl)oxy)benzyl 3,7-dimorpholino-10H-phenothiazine-10-carboxylate<br>Chemical Formula: C34H43N3O5SSi<br>Molecular Weight: 633.88 |
| 36 | | 4-((tert-butyldimethylsilyl)oxy)benzyl 3,7-dimorpholino-10H-phenothiazine-10-carboxylate<br>Chemical Formula: C34H43N3O5SSi<br>Molecular Weight: 633.88 |
| 37 | | 4-((tert-butyldimethylsilyl)oxy)benzyl 1,2,3,4,8,9,10,11-octahydro-6H-dipyrido[3,2-b:2',3'-i]phenothiazine-6-carboxylate<br>Chemical Formula: C32H39N3O3SSi<br>Molecular Weight: 573.83 |
| 38 | | 4-((tert-butyldimethylsilyl)oxy)benzyl 5-methyl-1,2,3,4,10,11,12,13-octahydro-7H-dipyrido[2,3-c:3',2'-h]phenothiazine-7-carboxylate<br>Chemical Formula: C33H41N3O3SSi<br>Molecular Weight: 587.85 |

FIG. 15

| 39 | | 4-((tert-butyldimethylsilyl)oxy)benzyl 3,7-bis(dimethylamino)-10H-phenoxazine-10-carboxylate<br>Chemical Formula: C30H39N3O4Si<br>Molecular Weight: 533.74 |
|---|---|---|
| 40 | | 3-((tert-butyldimethylsilyl)oxy)benzyl 3,7-bis(dimethylamino)-10H-phenothiazine-10-carboxylate<br>Chemical Formula: C30H39N3O3SSi<br>Molecular Weight: 549.81 |
| 41 | | 4-((tert-butyldimethylsilyl)oxy)benzyl 2,8-bis(dimethylamino)-10-methylphenazine-5(10H)-carboxylate<br>Chemical Formula: C31H42N4O3Si<br>Molecular Weight: 546.79 |

FIG. 16

FLUORIDE FLUORESCENCE PROBE

FIELD OF THE INVENTION

The present invention relates to a fluorescent probe which can selectively detect fluoride (F⁻). Methylene blue (MB) derivatives selectively react with F⁻ by desilylation reaction to act as such fluorescent probe.

BACKGROUND OF THE INVENTION

Fluoride (F⁻) extensively exists in natural water and is used as an additive, e.g. anti-caries agent to dental hygiene product, to prevent tooth decay, enhance the remineralization of enamel and inhibit the demineralization of enamel and root surfaces. Therefore, there is a need to detect the presence of fluoride and preferably to assess the amount of fluoride.

Many studies tried to determine optimal levels of fluoride for anti-caries agent. To help determination of F⁻, fluorescent chemical sensors have drawn people's attention because of their high selectivity, high sensitivity and have been utilized in a wide variety of applications. In recent years, many fluorescent probes have been designed to exploit the unique reactivity of F⁻, using different mechanisms, including cleavage reactions, nucleophilic addition reactions and supramolecular interactions. There is a continuous need for chemical probes that is highly selective for F⁻ in the presence of various anions and will exhibit high fluorescence intensity changes upon reaction with F⁻.

Moreover, fluorescent probes for F⁻ with the absorption and emission spectra both in the red and even near-infrared regions are desired because these regions are more favorable for biological imaging applications and usually cause less photo damage during cell imaging. However, to the best of our knowledge, still no fluorescent probes whose absorption and emission spectra are both in red region. Therefore, there is also a need to provide a fluorescent probe whose absorption and emission spectra are both in red and even near-infrared regions.

It is an advantage to have a probe that works well in relatively easy and simple to synthesize.

It is also an advantage to have a probe that is less toxic, or at least minimizes toxicity, to biological cells so that experiments with living cells may be conducted.

Sodium fluoride (NaF) and sodium monofluorophosphate (MFP) are the most common fluoride compounds used in commercial dental hygiene products. NaF can release fluoride directly through ionization, while MFP should be hydrolyzed first by phosphatases present in saliva, then release F⁻. Although NaF and MFP may have quite different properties, so far no probe has been reported to distinguish them. Therefore, verifying different sources of F⁻ is important. More importantly, although F⁻ have different sources such as NaF and MFP which are common additives to our toothpaste, no reported fluorescent probes can distinguish them.

SUMMARY OF THE INVENTION

The present invention addresses this need by the surprising discovery of a fluorescent F⁻ probe platform containing methylene blue derivative moiety as fluorophore, linked via amide moiety to alkyl-silyl-oxy-phenyl group, which can selectively react with F⁻. This class of compound is particularly useful given the additional surprising discovery that desilylation reaction has advantage of its high selectivity toward F⁻ among various anions.

This class of probe compounds can be used for assessing the presence of F⁻ by detecting light emission and/or absorption of the compound. Alternatively, this class of probe can be used for monitoring F⁻ in biofilm to study the physiological function of F⁻ in biological systems.

A first aspect of the invention provides for a compound having the following Formula (I):

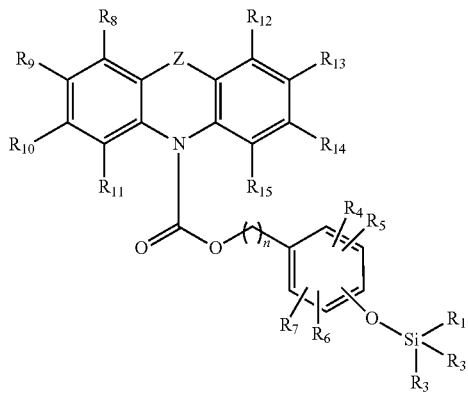

Formula (I)

wherein Z is selected from the group consisting of S, O and NR';

wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and R' are each independently a hydrogen or a hydrocarbyl, substituted or unsubstituted; and wherein n is from 1 to 10, or an optional isomer, diastereomer or enantiomer for Formula (I), or a salt thereof.

Preferably, n is from 1 to 5, preferably from 1 to 3, more preferably is 1 or 2.

Preferably, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and R' may be each independently selected from the group consisting of halogen, hydrogen, alkyl, alkenyl, alkynyl, cycloalkyl, cycloalkenyl, aryl, heteroalkyl, heteroalkenyl, heteroalkynyl, heterocycloalkyl, heterocycloalkenyl, heteroaryl; or wherein $R_8$ and $R_9$, $R_9$ and $R_{10}$, or $R_{10}$ and $R_{11}$, may together form a moiety selected from the group consisting of a cycloalkyl, cycloalkenyl, aryl, heterocycloalkyl, heterocycloalkenyl, and heteroaryl; or wherein $R_{12}$ and $R_{13}$, $R_{13}$ and $R_{14}$, or $R_{14}$ and $R_{15}$, may together form a moiety selected from the group consisting of a cycloalkyl, cycloalkenyl, aryl, heterocycloalkyl, heterocycloalkenyl, and heteroaryl; or wherein any two adjacent groups selected from $R_4$, $R_5$, $R_6$ and $R_7$, may together form a moiety selected from the group consisting of a cycloalkyl, cycloalkenyl, aryl, heterocycloalkyl, heterocycloalkenyl, and heteroaryl; and wherein the aforementioned may be substituted or unsubstituted.

In some embodiment, $R_4$, $R_5$, $R_6$ and $R_7$ may be each independently selected from the group consisting of halogen, hydrogen, alkyl, cycloalkyl, heteroalkyl, heterocycloalkyl; wherein at least one of $R_8$, $R_9$, $R_{10}$ and $R_{11}$ is a group of

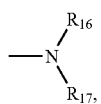

and wherein $R_{16}$ and $R_{17}$ are each independently selected from the group consisting of halogen, hydrogen, alkyl, cycloalkyl, heteroalkyl, heterocycloalkyl; wherein at least one of $R_{12}$, $R_{13}$, $R_{14}$ and $R_{15}$ is a group of

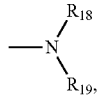

and wherein $R_{18}$ and $R_{19}$ are each independently selected from the group consisting of halogen, hydrogen, alkyl, cycloalkyl, heteroalkyl, heterocycloalkyl; and wherein the aforementioned may be substituted or unsubstituted.

In another aspect of the invention, a compound according to Formula (II) is provided,

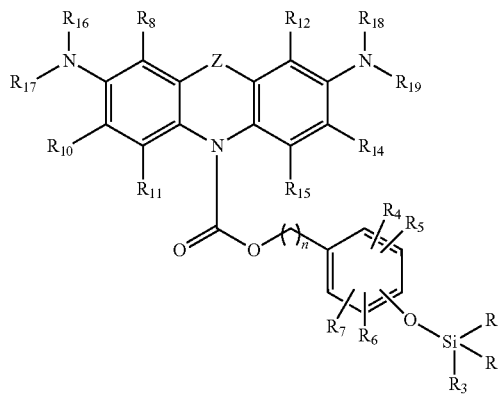

Formula (II)

wherein Z is selected from the group consisting of S, O and NR'; $R_1$, $R_2$, $R_3$, $R_4$, $R_5$, $R_6$, $R_7$, $R_8$, $R_{10}$, $R_{11}$, $R_{12}$, $R_{14}$, $R_{15}$, $R_{16}$, $R_{17}$, $R_{18}$, $R_{19}$ and R' are each independently selected from the group consisting of halogen, hydrogen, alkyl, alkenyl, alkynyl, cycloalkyl, cycloalkenyl, aryl, heteroalkyl, heteroalkenyl, hetero alkynyl, heterocycloalkyl, heterocycloalkenyl, heteroaryl; or wherein $R_{16}$ and $R_{17}$ may together form a moiety selected from the group consisting of a cycloalkyl, cycloalkenyl, aryl, heterocycloalkyl, heterocycloalkenyl, and heteroaryl; or wherein $R_{18}$ and $R_{19}$ may together form a moiety selected from the group consisting of a cycloalkyl, cycloalkenyl, aryl, heterocycloalkyl, heterocycloalkenyl, and heteroaryl; and wherein the aforementioned may be substituted or unsubstituted.

Preferably, $R_1$, $R_2$, and $R_3$ are each independently selected from the group consisting of halogen, hydrogen, alkyl, cycloalkyl, heteroalkyl, heterocycloalkyl, and aryl; $R_4$, $R_5$, $R_6$ and $R_7$ are each independently selected from the group consisting of halogen, hydrogen, alkyl, cycloalkyl, heteroalkyl, and heterocycloalkyl; $R_8$, $R_{10}$, $R_{11}$, $R_{12}$, $R_{14}$, and $R_{15}$ are each independently selected from the group consisting of halogen, hydrogen, alkyl, cycloalkyl, heteroalkyl, and heterocycloalkyl; preferably selected from the group consisting of halogen, hydrogen, and branched or unbranched $C_1$-$C_{10}$ alkyl; more preferably selected from the group consisting of hydrogen, and branched or unbranched $C_1$-$C_5$ alkyl; $R_{16}$, $R_{17}$, $R_{18}$, and $R_{19}$ are each independently selected from the group consisting of halogen, hydrogen, alkyl, cycloalkyl, heteroalkyl, and heterocycloalkyl; or wherein $R_{16}$ and $R_{17}$ may together form a moiety selected from the group consisting of a cycloalkyl, heterocycloalkyl, aryl, and heteroaryl; or wherein $R_{18}$ and $R_{19}$ may together form a moiety selected from the group consisting of a cycloalkyl, heterocycloalkyl, aryl, and heteroaryl.

In another aspect of the invention, a compound according to Formula (III) is provided,

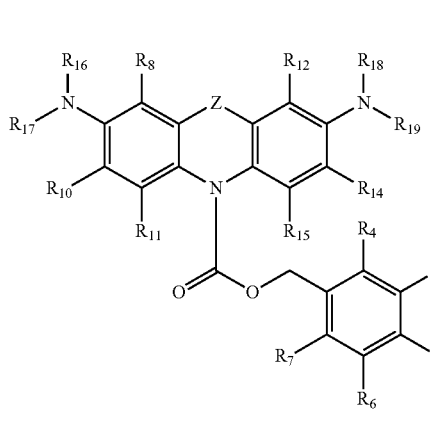

Formula (III)

wherein Z is S or O; preferably is S; $R_1$, $R_2$, and $R_3$ are each independently selected from the group consisting of halogen, hydrogen, alkyl, alkenyl, alkynyl, cycloalkyl, cycloalkenyl, aryl, heteroalkyl, heteroalkenyl, heteroalkynyl, heterocycloalkyl, heterocycloalkenyl, heteroaryl; $R_4$, $R_5$, $R_6$ and $R_7$ are each independently selected from the group consisting of halogen, hydrogen, alkyl, cycloalkyl, heteroalkyl, and heterocycloalkyl; $R_8$, $R_{10}$, $R_{11}$, $R_{12}$, $R_{14}$, and $R_{15}$ are each independently selected from the group consisting of halogen, hydrogen, alkyl, cycloalkyl, heteroalkyl, and heterocycloalkyl; and wherein the aforementioned may be substituted or unsubstituted.

Preferably, $R_8$, $R_{10}$, $R_{11}$, $R_{12}$, $R_{14}$, and $R_{15}$ are each independently selected from the group consisting of halogen, hydrogen, and branched or unbranched $C_1$-$C_5$ alkyl.

Preferably, $R_1$, $R_2$, and $R_3$ are each independently selected from the group consisting of halogen, hydrogen, branched or unbranched $C_1$-$C_{10}$ alkyl, branched or unbranched $C_3$-$C_{10}$ cycloalkyl, and branched or unbranched $C_6$-$C_{15}$ aryl.

More preferably, the group N($R_{16}$)($R_{17}$) and group N($R_{18}$) ($R_{19}$) are the same; $R_8$ and $R_{12}$ are the same; $R_{10}$ and $R_{14}$ are the same; and $R_{11}$ and $R_{15}$ are the same.

In another aspect of the invention, the compound of the present invention is selected from the group consisting of:
(i) 4-((tert-butyldiphenylsilyl)oxy)benzyl 3,7-bis(dimethylamino)-10H-phenothiazine-10-carboxylate;
(ii) 4-((triisopropylsilyl)oxy)benzyl 3,7-bis (dimethylamino)-10H-phenothiazine-10-carboxylate;
(iii) 4-((tert-butyldimethylsilyl)oxy)benzyl 3,7-bis(dimethylamino)-10H-phenothiazine-10-carboxylate;
(iv) 4-((trimethylsilyl)oxy)benzyl 3,7-bis(dimethylamino)-10H-phenothiazine-10-carboxylate;
(v) 4-((tri-tert-butylsilyl)oxy)benzyl 3,7-bis(dimethylamino)-10H-phenothiazine-10-carboxylate;

(vi) 4-((triethylsilyl)oxy)benzyl 3,7-bis(dimethylamino)-10H-phenothiazine-10-carboxylate;
(vii) 3,5-dimethyl-4-((trimethylsilyl)oxy)benzyl 3,7-bis(dimethylamino)-10H-phenothiazine-10-carboxylate;
(viii) 4-((triphenylsilyl)oxy)benzyl 3,7-bis(dimethylamino)-10H-phenothiazine-10-carboxylate;
(ix) 4-((methyldiphenylsilyl)oxy)benzyl 3,7-bis(dimethylamino)-10H-phenothiazine-10-carboxylate;
(x) 4-((diisopropyl(phenyl)silyl)oxy)benzyl 3,7-bis(dimethylamino)-10H-phenothiazine-10-carboxylate;
(xi) 3-((tert-butyldimethylsilyl)oxy)benzyl 3,7-bis(dimethylamino)-10H-phenothiazine-10-carboxylate;
(xii) 4-((tert-butyldiphenylsilyl)oxy)benzyl 3,7-bis (diethylamino)-10H-phenothiazine-10-carboxylate;
(xiii) 4-((tert-butyldiphenylsilyl)oxy)benzyl 3,7-bis(dimethylamino)-2,8-dimethyl-10H-phenothiazine-10-carboxylate;
(xiv) 4-((tert-butyldiphenylsilyl)oxy)benzyl 3,7-bis(ethylamino)-2,8-dimethyl-10H-phenothiazine-10-carboxylate;
(xv) 4-((tert-butyldiphenylsilyl)oxy)benzyl 3,7-di(pyrrolidin-1-yl)-10H-phenothiazine-10-carboxylate;
(xvi) 4-((tert-butyldiphenylsilyl)oxy)benzyl 3,7-di(piperidin-1-yl)-10H-phenothiazine-10-carboxylate;
(xvii) 4-((tert-butyldiphenylsilyl)oxy)benzyl 3,7-dimorpholino-10H-phenothiazine-10-carboxylate;
(xviii) 4-((tert-butyldiphenylsilyl)oxy)benzyl 3,7-bis (phenylamino)-10H-phenothiazine-10-carboxylate;
(xix) 4-((tert-butyldiphenylsilyl)oxy)benzyl 1,2,3,4,8,9,10,11-octahydro-6H-dipyrido[3,2-b:2',3'-i]phenothiazine-6-carboxylate;
(xx) 4-((tert-butyldiphenylsilyl)oxy)benzyl 5-methyl-1,2,3,4,10,11,12,13-octahydro-7H-dipyrido[2,3-c :3',2'-h]phenothiazine-7-carboxylate;
(xxi) 4-((triisopropylsilyl)oxy)benzyl 3,7-bis(diethylamino)-10H-phenothiazine-10-carboxylate;
(xxii) 4-((triisopropylsilyl)oxy)benzyl 3,7-bis(dimethylamino)-2,8-dimethyl-10H-phenothiazine-10-carboxylate;
(xxiii) 4-((triisopropylsilyl)oxy)benzyl 3,7-bis(ethylamino)-2,8-dimethyl-10H-phenothiazine-10-carboxylate;
(xxiv) 4-((triisopropylsilyl)oxy)benzyl 3,7-di(pyrrolidin-1-yl)-10H-phenothiazine-10-carboxylate;
(xxv) 4-((triisopropylsilyl)oxy)benzyl 3,7-di(piperidin-1-yl)-10H-phenothiazine-10-carboxylate;
(xxvi) 4-((triisopropylsilyl)oxy)benzyl 3,7-dimorpholino-10H-phenothiazine-10-carboxylate;
(xxvii) 4-((triisopropylsilyl)oxy)benzyl 3,7-bis(phenylamino)-10H-phenothiazine-10-carboxylate;
(xxviii) 4-((tert-butyldiisopropylsilyl)oxy)benzyl 1,2,3,4,8,9,10,11-octahydro-6H-dipyrido[3,2-b:2',3'-i]phenothiazine-6-carboxylate;
(xxix) 4-((tert-butyldiisopropylsilyl)oxy)benzyl 5-methyl-1,2,3,4,10,11,12,13-octahydro-7H-dipyrido[2,3-c:3',2'-h]phenothiazine-7-carboxylate;
(xxx) 4-((tert-butyldimethylsilyl)oxy)benzyl 3,7-bis(diethylamino)-10H-phenothiazine-10-carboxylate;
(xxxi) 4-((tert-butyldimethylsilyl)oxy)benzyl 3,7-bis (dimethylamino)-2,8-dimethyl-10H-phenothiazine-10-carboxylate;
(xxxii) 4-((tert-butyldimethylsilyl)oxy)benzyl 3,7-bis (ethylamino)-2,8-dimethyl-10H-phenothiazine-10-carboxylate;
(xxxiii) 4-((tert-butyldimethylsilyl)oxy)benzyl 3,7-di (pyrrolidin-1-yl)-10H-phenothiazine-10-carboxylate;
(xxxiv) 4-((tert-butyldimethylsilyl)oxy)benzyl 3,7-di(piperidin-1-yl)-10H-phenothiazine-10-carboxylate;
(xxxv) 4-((tert-butyldimethylsilyl)oxy)benzyl 3,7-dimorpholino-10H-phenothiazine-10-carboxylate;
(xxxvi) 4-((tert-butyldimethylsilyl)oxy)benzyl 3,7-dimorpholino-10H-phenothiazine-10-carboxylate;
(xxxvii) 4-((tert-butyldimethylsilyl)oxy)benzyl 1,2,3,4,8,9,10,11-octahydro-6H-dipyrido[3,2-b:2',3'-i]phenothiazine-6-carboxylate;
(xxxviii) 4-((tert-butyldimethylsilyl)oxy)benzyl 5-methyl-1,2,3,4,10,11,12,13-octahydro-7H-dipyrido[2,3-c:3',2'-h]phenothiazine-7-carboxylate;
(xxxix) 4-((tert-butyldimethylsilyl)oxy)benzyl 3,7-bis(dimethylamino)-10H-phenoxazine-10-carboxylate;
(xl) 3-((tert-butyldimethylsilyl)oxy)benzyl 3,7-bis(dimethylamino)-10H-phenothiazine-10-carboxylate; and
(xli) 4-((tert-butyldimethylsilyl)oxy)benzyl 2,8-bis (dimethylamino)-10-methylphenazine-5(10H)-carboxylate.

Yet still another aspect of the invention provides for a method of detecting fluorine ion in a composition comprising the steps: (a) incubating the composition with a compound described above (e.g., a compound of Formula (I) or Formula (II) or Formula (III), or preferred or alternative compound embodiments within said Formulas (I) or (II) or (III)); (b) shining excitation light to the incubated composition; preferably wherein the shined light has wavelength of at least from 550 nm to 700 nm; and (c) detecting light emission from the compound, preferably from 620 nm to 760 nm.

Yet still another aspect of the invention provides for a method of detecting fluorine ion in a composition comprising the steps: (a) incubating the composition with a compound described above (e.g., a compound of Formula (I) or Formula (II) or Formula (III), or preferred or alternative compound embodiments within said Formulas (I) or (II) or (III)); and (b) detecting light absorption from the compound, preferably from 550 nm to 750 nm.

Yet still another aspect of the invention provides for a method of quantitating fluorine ion in a biofilm comprising the steps: (a) optionally treating the biofilm with an oral care composition; (b) labeling the optionally treated biofilm with a compound described above (e.g., a compound of Formula (I) or Formula (II) or Formula (III), or preferred or alternative compound embodiments within said Formulas (I) or (II) or (III)); and (c) quantitating the labeled fluorine by measuring fluorescence light emitted from the labeled fluorine. In yet still another embodiment, the method is conducted with at least one specific compound previously described above or herein.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

FIG. 9 to FIG. 16 shows the chemical structures of non-limiting examples of inventive compounds.

DETAILED DESCRIPTION OF THE INVENTION

Figure 1A:
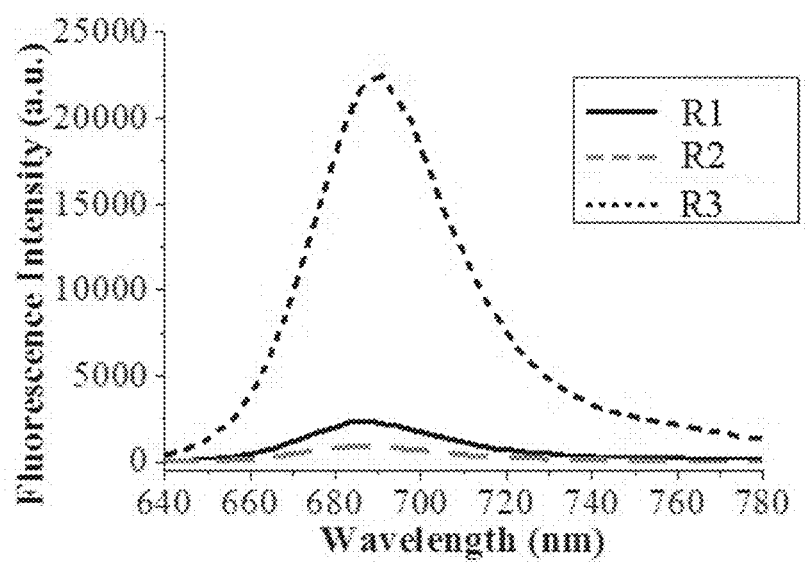
FIG. 1A shows fluorescence spectra of three inventive compounds R1-R3 upon addition of F⁻.

Definitions:

For purposes of the present invention the term "hydrocarbyl" is defined herein as any organic unit or moiety which is comprised of carbon atoms and hydrogen atoms. Included within the term hydrocarbyl are heterocycles. Non-limiting examples of various unsubstituted non-heterocyclic hydrocarbyl units include pentyl, 3-ethyloctanyl, 1,3-dimethylphenyl, cyclohexyl, cis-3-hexyl, 7,7-dimethylbicyclo [2.2.1]-heptan-1-yl, and napth-2-yl. Included with the definition of "hydrocarbyl" are the aromatic (aryl) and non-aromatic carbocyclic rings. The term "heterocycle" includes both aromatic (heteroaryl) and non-aromatic heterocyclic rings.

The term "substituted" is used throughout the specification. The term "substituted" is defined herein as "encompassing moieties or units which can replace a hydrogen atom, two hydrogen atoms, or three hydrogen atoms of a hydrocarbyl moiety. Also substituted can include replacement of hydrogen atoms on two adjacent carbons to form a new moiety or unit." For example, a substituted unit that requires a single hydrogen atom replacement includes halogen, hydroxyl, and the like. A two hydrogen atom replacement includes carbonyl, oximino, and the like. A two hydrogen atom replacement from adjacent carbon atoms includes epoxy, and the like. Three hydrogen atom replacement includes cyano, and the like. An epoxide unit is an example of a substituted unit which requires replacement of a hydrogen atom on adjacent carbons. The term "substituted" is used through the present specification to indicate that a hydrocarbyl moiety, inter alia, aromatic ring, alkyl chain, can have one or more of the hydrogen atoms replaced by a substituent. When a moiety is described a "substituted" any number of the hydrogen atoms may be replaced. For example, 4-hydroxyphenyl is a "substituted aromatic carbocyclic ring," (N,N-dimethyl-5-amino)octanyl is a "substituted $C_8$ alkyl unit", 3-guanidinopropyl is a "substituted $C_3$ alkyl unit," and 2-carboxypyridinyl is a "substituted heteroaryl unit".

In one embodiment, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and R' are each independently selected from the group consisting of H, alkyl, alkenyl, alkynyl, cycloalkyl, cycloalkenyl, aryl, heteroakyl, heteroalkenyl, heteroalkynyl, heterocycloalkyl, heterocycloalkenyl, heteroaryl, amino, cyano, nitro, etc. and the aforementioned may be substituted or unsubstituted. These terms are well known in the art. For a detailed description, see U.S. Pat. No. 6,919,346 B2 at column 2, line 61 to column 9, line 53, incorporated herein by reference.

Synthesis:

Unless otherwise noted, materials are obtained from commercial suppliers and are used without further purification. $^1$H NMR (400 MHz) and $^{13}$C NMR (100 MHz) spectra are taken on a Bruker AV400 nuclear magnetic resonance spectrometer, using DMSO-$d_6$, $CDCl_3$ or $CD_3CN$ as solvent and TMS as internal standard. High-resolution mass spectra (HR-MS) are measured on a Bruker Micro TOF II 10257 instrument with electro-spray ionization (ESI) technique and direct injection method.

The synthesis of three exemplary compounds of the present invention "Compound R1, R2, R3" is described.

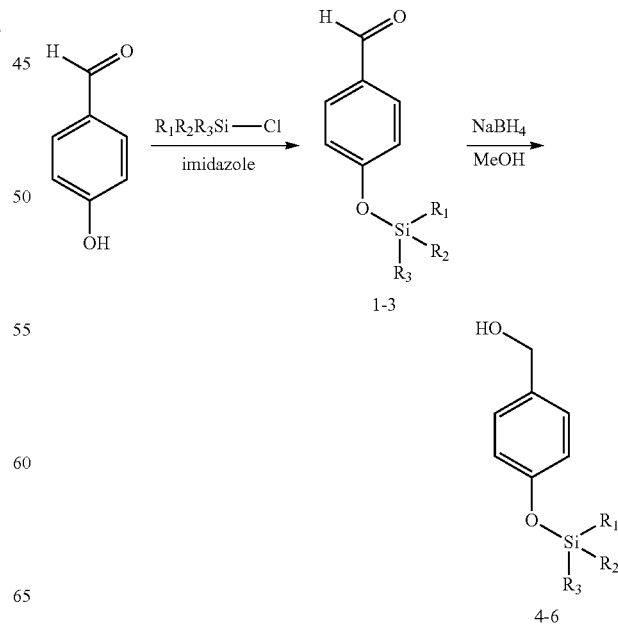

-continued

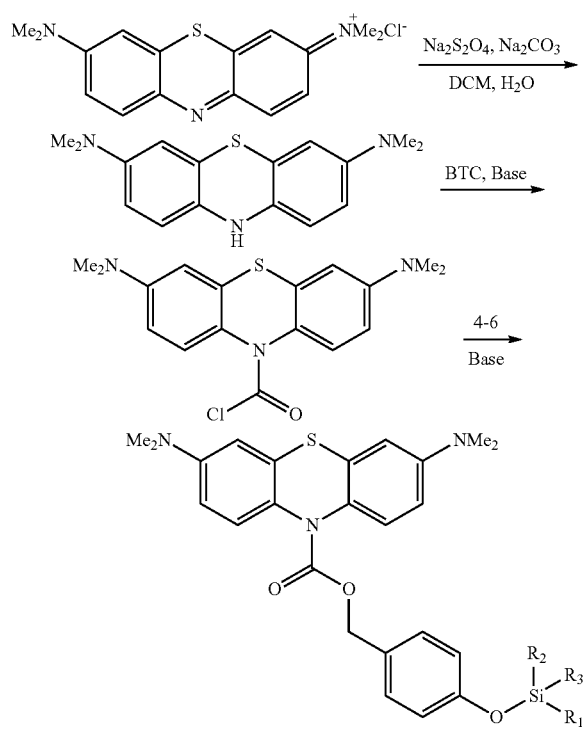

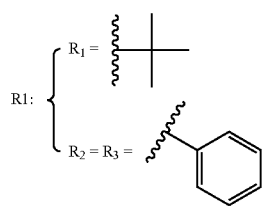

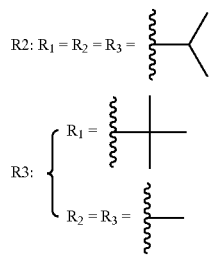

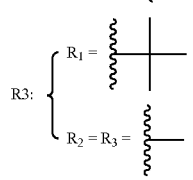

General Procedure for the Synthesis of Intermediate Compounds 1-3

4-hydroxybenzaldehyde (2.0 g, 16.38 mmol, 1.0 eq) and imidazole (3.35 g, 49.14 mmol, 3.0 eq) are dissolved in 30 mL of dichloromethane, the resulting mixture is stirred in an ice-water bath. Silyl chloride (19.66 mmol, 1.2 eq) is dissolved in 10 mL of dichloromethane and added dropwise. After addition, the mixture is stirred at room temperature until the reaction completed as indicated by TLC analysis which is conducted at 1 h intervals. The reaction mixture is poured into 300 mL of ice-water while stirring, and the resulting mixture is extracted with three 150 mL portions of dichloromethane. The combined extracts are washed with brine, dried over anhydrous sodium sulfate and evaporated on a rotary evaporator to afford an oily residue, which is purified by column chromatography (ethyl acetate/petroleum ether=1/20) to yield the pure product 1-3.

4-((tert-butyldiphenylsilyl)oxy)benzaldehyde (1)

White solid, 5.37 g, 91%.
$^1$H NMR (400 MHz, DMSO) δ 9.80 (s, 1H), 7.75-7.65 (m, 6H), 7.53-7.42 (m, 6H), 6.90 (d, J=8.4 Hz, 2H), 1.05 (s, 9H).

4-((triisopropylsilyl)oxy)benzaldehyde (2)

Colorless oil, 4.38g, 96%.
$^1$H NMR (400 MHz, DMSO) δ 9.87 (s, 1H), 7.84 (d, J=8.4 Hz, 2H), 7.05 (d, J=8.4 Hz, 2H), 1.34-1.25(m, 3H), 1.07 (d, J=7.6 Hz, 18H).

4-((tert-butyldimethylsilyl)oxy)benzaldehyde (3)

Colorless oil, 3.64 g 94%.
$^1$H NMR (400 MHz, DMSO) δ 7.18 (d, J=8.4 Hz, 2H), 6.79 (d, J=8.4 Hz, 2H), 5.05 (t, J=5.8 Hz, 1H), 4.40 (d, J=6.0 Hz, 2H), 0.94 (s, 9H), 0.17 (s, 6H).

General Procedure for the Synthesis of 4-6

To a solution of 1-3 (3.87 mmol, 1.0 eq) in 150 mL of MeOH, cooled with an ice-water bath, NaBH$_4$ (0.63 g, 16.64 mmol, 1.2 eq) is added in batches. After addition, the reaction mixture is stirred at this temperature for 30 min and then at room temperature until the reaction completed as indicated by TLC analysis (typically within 1-3 h).

The reaction mixture is poured into 200 mL of ice-water while stirring, and the resulting mixture is extracted with three 100 mL portions of dichloromethane. The combined extracts are washed with brine, dried over anhydrous sodium sulfate and evaporated on a rotary evaporator to afford an oily residue, which is purified by column chromatography (ethyl acetate/petroleum ether=1/20) to yield the pure product 4-6.

(4-((tert-butyldiphenylsilyl)oxy)phenyl)methanol (4)

White solid, 1.36 g, 97%.
$^1$H NMR (400 MHz, DMSO) δ 7.69-7.63 (m, 5H), 7.47-7.42 (m, 5H), 7.07 (d, J=8.8 Hz, 2H), 6.68 (d, J=8.4 Hz, 2H), 4.99 (t, J=5.6 Hz, 1H), 4.33 (d, J=5.2 Hz, 2H), 1.03 (s, 9H).

(4-((triisopropylsilyl)oxy)phenyl)methanol (5)

Colorless oil, 1.07 g, 99%.
$^1$H NMR (400 MHz, DMSO) δ 7.18 (d, J=8.4 Hz, 2H), 6.81 (d, J=8.4 Hz, 2H), 5.05 (t, J=5.8 Hz, 1H), 4.40 (d, J=6.0 Hz, 2H), 1.27-1.18 (m, 3H), 1.05 (d, J=8.4 Hz, 18H).

(4-((tert-butyldimethylsilyl)oxy)phenyl)methanol (6)

Colorless oil, 0.9 g, 98%.
1H NMR (400 MHz, DMSO) δ 7.18 (d, J=8.4 Hz, 2H), 6.79 (d, J=8.4 Hz, 2H), 5.05 (t, J=5.8 Hz, 1H), 4.40 (d, J=6.0 Hz, 2H), 0.94 (s, 9H), 0.17 (s, 6H).

General Procedure for the Synthesis of R1-R3

Methylene blue (1.11 g, 3.75 mmol, 1.0 eq) is dissolved in 3 mL of water. Dichloromethane (10 mL) and Na$_2$CO$_3$ (2.38 g, 22.50 mmol, 6.0 eq) are added to the mixture and stirred at 60° C. under nitrogen atmosphere. Sodium dithionite (2.61 g, 15.00 mmol, 4 eq) is dissolved in 7 mL of water and added dropwise. After addition, the mixture is stirred at 60° C. under nitrogen atmosphere until the solution became yellow (typically within 15-30 min). The mixture is cooled with an ice-water bath, bis(trichloromethyl)carbonate (1.11 g, 3.75 mmol, 1.0 eq) is dissolved in 5 mL of dichloromethane and added dropwise. After addition, the mixture is stirred for another 1 h. The dichloromethane layer is separated from water layer and dried with anhydrous sodium sulfate quickly. After sodium sulfate is removed by filtration, the solution is added dropwise to a mixture of 4-6 (0.8 eq), 4-dimethylaminopyridine (DMAP) (0.92 g, 7.50 mmol, 2.0 eq), $Na_2CO_3$ (1.19 g, 11.25 mmol, 3.0 eq) and 5 mL dichloromethane. After addition, the mixture is stirred at an ice-water bath for 1 h and then at room temperature until reaction completed as indicated by TLC analysis.

Removed the undissolved substance by filtration, the solution is poured into 200 mL of ice-water while stirring, and the resulting mixture is extracted with three 100 mL portions of dichloromethane. The combined extracts are washed with brine, dried over anhydrous sodium sulfate and evaporated on a rotary evaporator to afford an oily residue, which is purified by column chromatography (ethyl acetate/n-hexane=1/20 then 1/15) to yield the pure product R1~R3.

4-((tert-butyldiphenylsilyl)oxy)benzyl 3,7-bis(dimethylamino)-10H-phenothiazine-10-carboxylate (R1)

White solid, 0.51 g, 20%.
$^1$H NMR (400 MHz, $CD_3CN$) δ 7.72 (dd, J=8.0, 1.2 Hz, 4H), 7.49-7.45 (m, 2H), 7.42-7.39 (m, 4H), 7.26 (d, J=8.8 Hz, 2H), 7.07 (d, J=8.4 Hz, 2H), 6.74 (d, J=8.8 Hz, 2H), 6.68 (d, J=2.8 Hz, 2H), 6.62 (m, 2H), 5.00 (s, 2H), 2.90 (s, 12H), 1.07 (s, 9H).
$^{13}$C NMR (100 MHz, $CD_3CN$) δ 156.42, 155.12, 150.11, 136.44, 133.64, 133.56, 131.21, 130.38, 129.05, 128.94, 128.13, 120.58, 120.36, 111.90, 110.86, 68.12, 40.84, 26.89, 19.92.
HR-MS, calcd for $C_{40}H_{44}N_3O_3SSi$ ($[M+H]^+$) 674.2867, found 674.2871.

4-((triisopropylsilyl)oxy)benzyl 3,7-bis(dimethylamino)-10H-phenothiazine-10-carboxylate (R2)

White solid, 0.52 g, 23%.
$^1$H NMR (400 MHz, $CD_3CN$) δ 7.30 (d, J=8.8 Hz, 2H), 7.21 (d, J=8.4 Hz, 2H), 6.88 (d, J=8.4 Hz, 2H), 6.69 (d, J=2.8 Hz, 2H), 6.64 (m, 2H), 5.07 (s, 2H), 2.90 (s, 12H), 1.31-1.22 (m, 3H), 1.09 (d, J=7.6 Hz, 18H).
$^{13}$C NMR (100 MHz, $CD_3CN$) δ 156.96, 155.16, 150.07, 133.62, 130.64, 130.21, 129.02, 128.15, 120.77, 111.88, 110.84, 68.25, 40.83, 18.32, 13.46.
HR-MS, calcd for $C_{33}H_{46}N_3O_3SSi$ ($[M+H]^+$) 592.3024, found 592.3021.

4-((tert-butyldimethylsilyl)oxy)benzyl 3,7-bis(dimethylamino)-10H-phenothiazine-10-carboxylate (R3)

White solid, 0.37 g, 18%.
$^1$H NMR (400 MHz, $CD_3CN$) δ 7.31 (d, J=9.2 Hz, 2H), 7.22 (d, J=8.8 Hz, 2H), 6.84 (d, J=8.4 Hz, 2H), 6.69 (d, J=2.4 Hz, 2H), 6.65 (dd, J=8.8, 2.8 Hz, 2H), 5.08 (s, 2H), 2.90 (s, 12H), 0.98 (s, 9H), 0.19 (s, 6H).
$^{13}$C NMR (100 MHz, $CD_3CN$) δ 150.56, 155.14, 150.06, 133.60, 130.59, 130.44, 128.95, 128.13, 120.97, 118.29, 110.82, 68.21, 40.81, 26.01, 18.58, −4.26.
HR-MS, calcd for $C_{30}H_{40}N_3O_3SSi$ ($[M+H]^+$) 550.2554, found 550.2567.

Derivations of Compound R1-R3

Many further derivations from the basic molecules of Compounds R1-R3 can be made by those skilled in the art consistent with Formulas (I) to (III) by using starting materials and intermediates that are known or commercially available or by further modifying these molecules by known methods. Non-limiting examples of these compounds within the scope of Formula (I) and/or Formula (II) and/or Formula (III) including the following (chemical structures are disclosed in FIGS. 9 to 16):

(4) 4-((trimethylsilyl)oxy)benzyl 3,7-bis (dimethylamino)-10H-phenothiazine-10-carboxylate (Chemical Formula: C27H33N3O3SSi) (Molecular Weight: 507.72);

(5) 4-((tri-tert-butylsilyl)oxy)benzyl 3,7-bis (dimethylamino)-10H-phenothiazine-10-carboxylate (Chemical Formula: C36H51N3O3SSi) (Molecular Weight: 633.97);

(6) 4-((triethylsilyl)oxy)benzyl 3,7-bis (dimethylamino)-10H-phenothiazine-10-carboxylate (Chemical Formula: C30H39N3O3SSi) (Molecular Weight: 549.81);

(7) 3,5-dimethyl-4-((trimethylsilyl)oxy)benzyl 3,7-bis (dimethylamino)-10H-phenothiazine-10-carboxylate (Chemical Formula: C29H37N3O3SSi) (Molecular Weight: 535.78);

(8) 4-((triphenylsilyl)oxy)benzyl 3,7-bis(dimethylamino)-10H-phenothiazine-10-carboxylate (Chemical Formula: C42H39N3O3SSi) (Molecular Weight: 693.94);

(9) 4-((methyldiphenylsilyl)oxy)benzyl 3,7-bis(dimethylamino)-10H-phenothiazine-10-carboxylate (Chemical Formula: C37H37N3O3SSi) (Molecular Weight: 631.87);

(10) 4-((diisopropyl(phenyl)silyl)oxy)benzyl 3,7-bis (dimethylamino)-10H-phenothiazine-10-carboxylate (Chemical Formula: C36H43N3O3SSi) (Molecular Weight: 625.90);

(11) 3-((tert-butyldimethylsilyl)oxy)benzyl 3,7-bis(dimethylamino)-10H-phenothiazine-10-carboxylate (Chemical Formula: C30H39N3O3SSi) (Molecular Weight: 549.81);

(12) 4-((tert-butyldiphenylsilyl)oxy)benzyl 3,7-bis(diethylamino)-10H-phenothiazine-10-carboxylate (Chemical Formula: C44H51N3O3SSi) (Molecular Weight: 730.06);

(13) 4-((tert-butyldiphenylsilyl)oxy)benzyl 3,7-bis(dimethylamino)-2,8-dimethyl-10H-phenothiazine-10-carboxylate (Chemical Formula: C42H47N3O3SSi) (Molecular Weight: 702.00);

(14) 4-((tert-butyldiphenylsilyl)oxy)benzyl 3,7-bis(ethylamino)-2,8-dimethyl-10H-phenothiazine-10-carboxylate (Chemical Formula: C42H47N3O3SSi) (Molecular Weight: 702.00);

(15) 4-((tert-butyldiphenylsilyl)oxy)benzyl 3,7-di(pyrrolidin-1-yl)-10H-phenothiazine-10-carboxylate (Chemical Formula: C44H47N3O3SSi) (Molecular Weight: 726.02);

(16) 4-((tert-butyldiphenylsilyl)oxy)benzyl 3,7-di(piperidin-1-yl)-10H-phenothiazine-10-carboxylate (Chemical Formula: C46H51N3O3SSi) (Molecular Weight: 754.08);

(17) 4-((tert-butyldiphenylsilyl)oxy)benzyl 3,7-dimorpholino-10H-phenothiazine-10-carboxylate (Chemical Formula: C44H47N3O5SSi) (Molecular Weight: 758.02);

(18) 4-((tert-butyldiphenylsilyl)oxy)benzyl 3,7-bis (phenylamino)-10H-phenothiazine-10-carboxylate (Chemical Formula: C48H43N3O3SSi) (Molecular Weight: 770.04);

(19) 4-((tert-butyldiphenylsilyl)oxy)benzyl 1,2,3,4,8,9,10,11-octahydro-6H-dipyrido[3,2-b:2',3'-i]phenothiazine-6-carboxylate (Chemical Formula: C42H43N3O3SSi) (Molecular Weight: 697.97);

(20) 4-((tert-butyldiphenylsilyl)oxy)benzyl 5-methyl-1,2,3,4,10,11,12,13-octahydro-7H-dipyrido[2,3-c:3',2'-h]phenothiazine-7-carboxylate (Chemical Formula: C43H45N3O3SSi) (Molecular Weight: 712.00);

(21) 4-((triisopropylsilyl)oxy)benzyl 3,7-bis(diethylamino)-10H-phenothiazine-10-carboxylate (Chemical Formula: C37H53N3O3SSi) (Molecular Weight: 647.99);

(22) 4-((triisopropylsilyl)oxy)benzyl 3,7-bis(dimethylamino)-2,8-dimethyl-10H-phenothiazine-10-carboxylate (Chemical Formula: C35H49N3O3SSi) (Molecular Weight: 619.94);

(23) 4-((triisopropylsilyl)oxy)benzyl 3,7-bis(ethylamino)-2,8-dimethyl-10H-phenothiazine-10-carboxylate (Chemical Formula: C35H49N3O3SSi) (Molecular Weight: 619.94);

(24) 4-((triisopropylsilyl)oxy)benzyl 3,7-di(pyrrolidin-1-yl)-10H-phenothiazine-10-carboxylate (Chemical Formula: C37H49N3O3SSi) (Molecular Weight: 643.96);

(25) 4-((triisopropylsilyl)oxy)benzyl 3,7-di(piperidin-1-yl)-10H-phenothiazine-10-carboxylate (Chemical Formula: C39H53N3O3SSi) (Molecular Weight: 672.02);

(26) 4-((triisopropylsilyl)oxy)benzyl 3,7-dimorpholino-10H-phenothiazine-10-carboxylate (Chemical Formula: C37H49N3O5SSi) (Molecular Weight: 675.96);

(27) 4-((triisopropylsilyl)oxy)benzyl 3,7-bis(phenylamino)-10H-phenothiazine-10-carboxylate (Chemical Formula: C41H45N3O3S Si) (Molecular Weight: 687.97);

(28) 4-((tert-butyldiisopropylsilyl)oxy)benzyl 1,2,3,4,8,9,10,11-octahydro-6H-dipyrido[3,2-b:2',3'-i]phenothiazine-6-carboxylate (Chemical Formula: C36H47N3O3SSi) (Molecular Weight: 629.94);

(29) 4-((tert-butyldiisopropylsilyl)oxy)benzyl 5-methyl-1,2,3,4,10,11,12,13-octahydro-7H-dipyrido[2,3-c:3',2'-h]phenothiazine-7-carboxylate (Chemical Formula: C37H49N3O3SSi) (Molecular Weight: 643.96);

(30) 4-((tert-butyldimethylsilyl)oxy)benzyl 3,7-bis (diethylamino)-10H-phenothiazine-10-carboxylate (Chemical Formula: C34H47N3O3SSi) (Molecular Weight: 605.91);

(31) 4-((tert-butyldimethylsilyl)oxy)benzyl 3,7-bis (dimethylamino)-2,8-dimethyl-10H-phenothiazine-10-carboxylate (Chemical Formula: C32H43N3O3SSi) (Molecular Weight: 577.86);

(32) 4-((tert-butyldimethylsilyl)oxy)benzyl 3,7-bis (ethylamino)-2,8-dimethyl-10H-phenothiazine-10-carboxylate (Chemical Formula: C32H43N3O3SSi) (Molecular Weight: 577.86);

(33) 4-((tert-butyldimethylsilyl)oxy)benzyl 3,7-di(pyrrolidin-1-yl)-10H-phenothiazine-10-carboxylate (Chemical Formula: C34H43N3O3SSi) (Molecular Weight: 601.88);

(34) 4-((tert-butyldimethylsilyl)oxy)benzyl 3,7-di (piperidin-1-yl)-10H-phenothiazine-10-carboxylate (Chemical Formula: C36H47N3O3SSi) (Molecular Weight: 629.94);

(35) 4-((tert-butyldimethylsilyl)oxy)benzyl 3,7-dimorpholino-10H-phenothiazine-10-carboxylate (Chemical Formula: C34H43N3O5SSi) (Molecular Weight: 633.88);

(36) 4-((tert-butyldimethylsilyl)oxy)benzyl 3,7-dimorpholino-10H-phenothiazine-10-carboxylate (Chemical Formula: C34H43N3O5SSi) (Molecular Weight: 633.88);

(37) 4-((tert-butyldimethylsilyl)oxy)benzyl 1,2,3,4,8,9,10,11-octahydro-6H-dipyrido[3,2-b:2',3'-i]phenothiazine-6-carboxylate (Chemical Formula: C32H39N3O3SSi) (Molecular Weight: 573.83);

(38) 4-((tert-butyldimethylsilyl)oxy)benzyl 5-methyl-1,2,3,4,10,11,12,13-octahydro-7H-dipyrido[2,3-c:3',2'-h]phenothiazine-7-carboxylate (Chemical Formula: C33H41N3O3SSi) (Molecular Weight: 587.85);

(39) 4-((tert-butyldimethylsilyl)oxy)benzyl 3,7-bis(dimethylamino)-10H-phenoxazine-10-carboxylate (Chemical Formula: C30H39N3O4Si) (Molecular Weight: 533.74); and

(40) 3-((tert-butyldimethylsilyl)oxy)benzyl 3,7-bis(dimethylamino)-10H-phenothiazine-10-carboxylate (Chemical Formula: C30H39N3O3SSi) (Molecular Weight: 549.81).

(41) 4-((tert-butyldimethylsilyl)oxy)benzyl 2,8-bis(dimethylamino)-10-methylphenazine-5(10H)-carboxylate (Chemical Formula: C31H42N4O3Si) (Molecular Weight: 546.79).

Fluoride Ion Sensing:

The procedure for fluoride ion sensing is described. Stock solutions of inventive compounds R1-R3 (1 mM) are prepared in DMSO. The test solutions of the inventive compounds R1-R3 (10 μM) in 10 mM DMSO-HEPES solution (3/2, v/v, 10 mM HEPES, pH=7.2) are prepared by placing stock solutions in 10-mL volumetric flask, and diluting with buffer solution. The resulting solutions are shaken well and incubated at room temperature for 50 minutes before recording the spectra.

Sodium fluoride (NaF) is used as a fluoride source for the fluoride ion sensing test. Stock solution of NaF (1 mM) is prepared in deionized water. The test solutions of the inventive compounds R1-R3 (10 μM) with NaF (500 μM) are prepared by placing stock solutions in 10-mL volumetric flask, and diluting with buffer solution. The resulting solutions are shaken well and incubated at room temperature for 50 minutes before recording the spectra.

UV-visible spectra are recorded on a Shimadzu UV-2550 spectrometer. Steady-state emission experiments at room temperature are measured on an Edinburgh instrument FLS-920 spectrometer with a Xe lamp as an excitation source. Unless otherwise noted, for all measurements, the excitation wavelength is 620 nm and the emission wavelength is collected from 640 to 780 nm.

Results of fluoride ion response are described. The inventive compounds R1, R2 and R3 have no absorption and emission in visible range. This is probably due to the small conjugate system of the compounds.

Figure 1B:
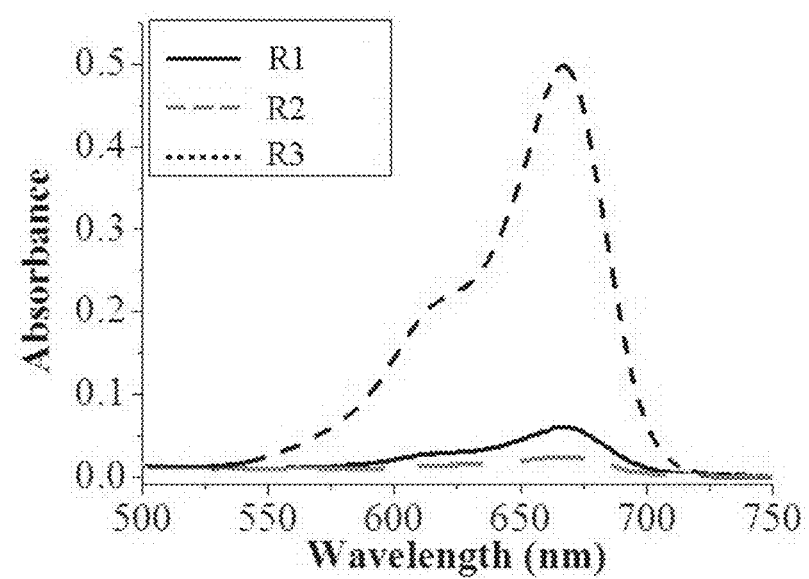
FIG. 1B shows absorption spectra of the three inventive compounds R1-R3 upon addition of with an excitation of 620 nm. Compound R1 is 4-((tert-butyldiphenylsilyl)oxy) benzyl 3,7-bis(dimethylamino)-10H-phenothiazine-10-carboxylate. Compound R2 is 4-((triisopropylsilyl)oxy)benzyl 3,7-bis (dimethylamino)-10H-phenothiazine-10-carboxylate. Compound R3 is 4-((tert-butyldimethylsilyl)oxy)benzyl 3,7-bis(dimethylamino)-10H-phenothiazine-10-carboxylate.

FIG. 1A shows fluorescence spectra of three inventive compounds R1-R3 (10 μM) after treated with 500 μM NaF (incubated for 50 min, DMSO-HEPES solution (3/2, v/v, 10 mM HEPES, pH=7.2)). FIG. 1B shows absorption spectra of the three inventive compounds R1-R3 (10 μM) after treated with 500 μM NaF, with an excitation of 620 nm (incubated for 50 min, DMSO-HEPES solution (3/2, v/v, 10 mM HEPES, pH=7.2)). As shown in FIG. 1A and 1B, all the three inventive compounds R1-R3 could react with NaF, with the absorption at 667 nm and the emission intensity at 690 nm drastically enhanced. Without wishing to be bound by any theory, the fluorescence intensity enhancement is because that $F^-$ triggers cleavage of the Si—O bond so as to afford the common dye methyl blue (MB) which exhibit a color change. The color changed from colorless to blue, which can be visible by naked eyes. The reaction mechanism is further confirmed by HR-MS analysis in aqueous solution. After treated with NaF, a new peak is appeared in the solution with almost the same HR-MS data for the three compounds (R1: 284.1214; R2: 284.1202; R3: 284.1209), which is nearly identical to the theoretical molecular mass of the MB ($[M-Cl^-]^+$=284.1216).

Among the three inventive compounds R1-R3, R3 shows fluorescent intensity (at 690 nm) and absorbance (at 667 nm) change much larger than that of R1 and R2 after reaction with 500 μM NaF for 50 mM.

Fluorescence Change of R3 Upon Different $F^-$ Concentration and Reaction Time

Figure 2:
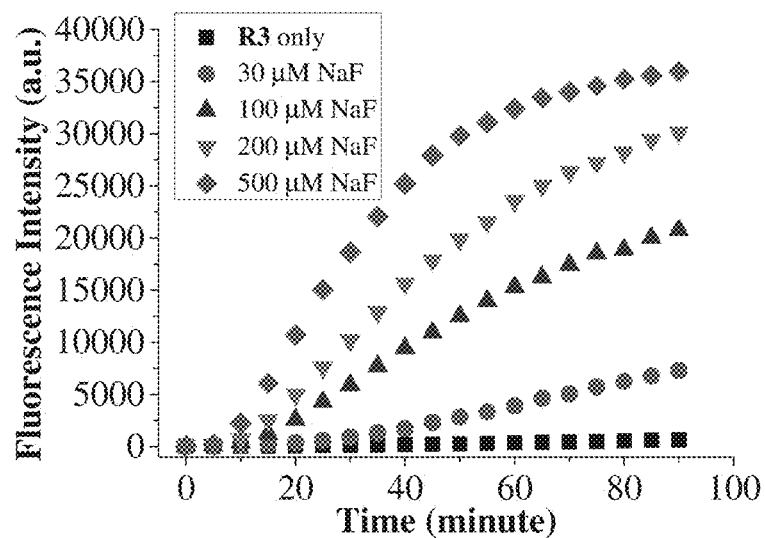
FIG. 2 shows dependence of fluorescence at 690 nm for inventive compound R3 (10 μM) with different concentrations of NaF.

FIG. 2 shows dependence of fluorescence at 690 nm for inventive compound R3 (10 μM) with time increase after treated with different concentrations of NaF (DMSO-HEPES solution, 3/2, v/v, 10 mM HEPES, pH=7.2)). Results in FIG. 2 show that, with addition of $F^-$, the fluorescent intensity change is dependent on both the reaction time and concentration of NaF. Specifically, with the same reaction time (incubation period), the fluorescence intensity change become larger along with the increase of the concentration of NaF. In another word, with the same concentration of R3, the reaction would go quickly with higher concentration of NaF.

Fluorescence Intensity Change with pH Variation

Figure 3:
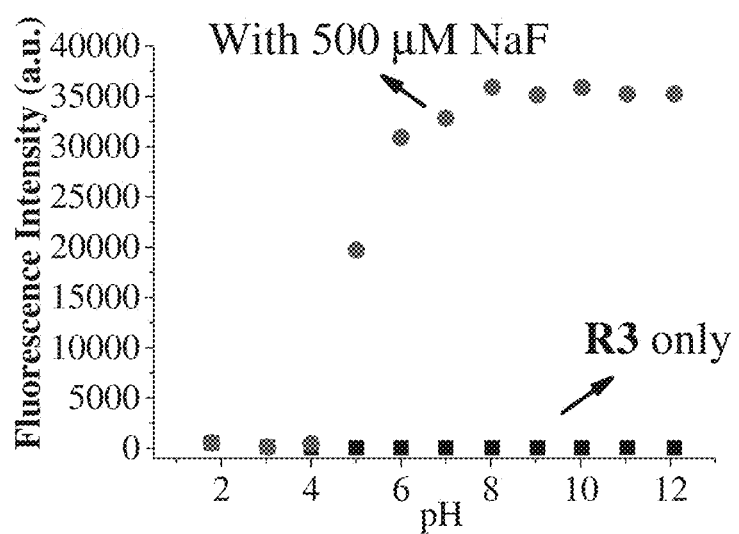
FIG. 3 shows fluorescence intensity enhancement at 690 nm for inventive compound R3 (10 μM) at different pH.

Fluorescence change of inventive compound R3 before/after treated with NaF under different pH levels are described. FIG. 3 shows fluorescence intensity enhancement at 690 nm for inventive compound R3 (10 μM) before/after react with NaF at different pH values. Studies show that the inventive compound R3 could remain stable in a range of pH 2-12 (shown in dotted square in FIG. 3). When treated with 500 μM NaF in DMSO-HEPES solution after incubated for 50 min, a drastic fluorescence intensity enhancement is observed in a range of pH 5-12, which indicates that R3 could be used in conventional environment.

Anion Selectivity

Figure 4A:
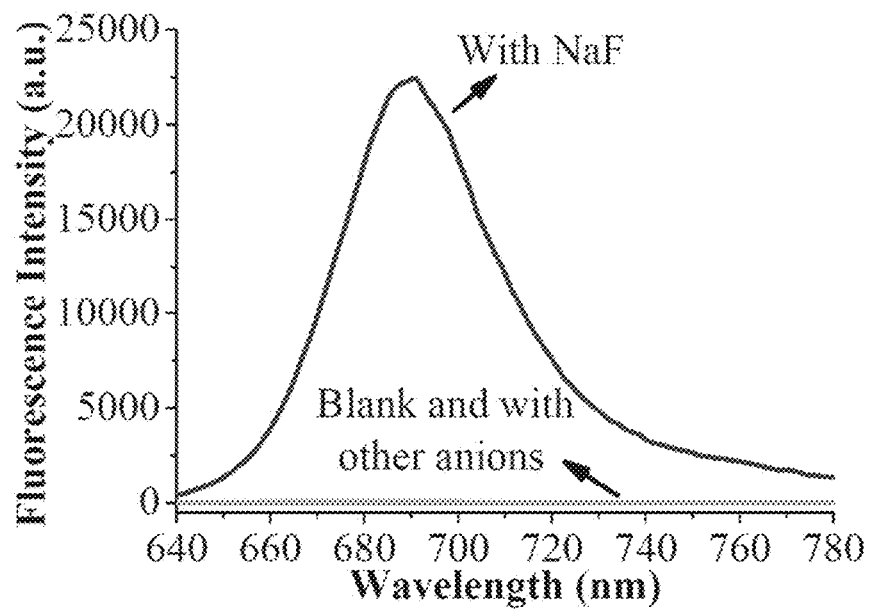
FIG. 4A shows fluorescence spectra of inventive compound R3 (10 μM) upon addition of 500 μM various tested analytes ($F^-$, $CO_3^{2-}$, $PO_4^{3-}$, $H_2PO_4^-$, $NO_3^-$, $NO_2^-$, $SO_4^{2-}$, $SO_3^{2-}$, $S_2O_3^{2-}$, $CH_3COO^-$, $Cl^-$, $Br^-$, $I^-$, $N_3^-$, $SCN^-$, $C_2O_4^{2-}$, BSA) (DMSO-HEPES solution (3/2, v/v, 10 mM HEPES, pH=7.2). Herein HEPES is an abbreviation for 4-(2-hydroxyethyl)-1-piperazineethanesulfonic acid, which is a zwitterionic biological buffer.
Figure 4B:
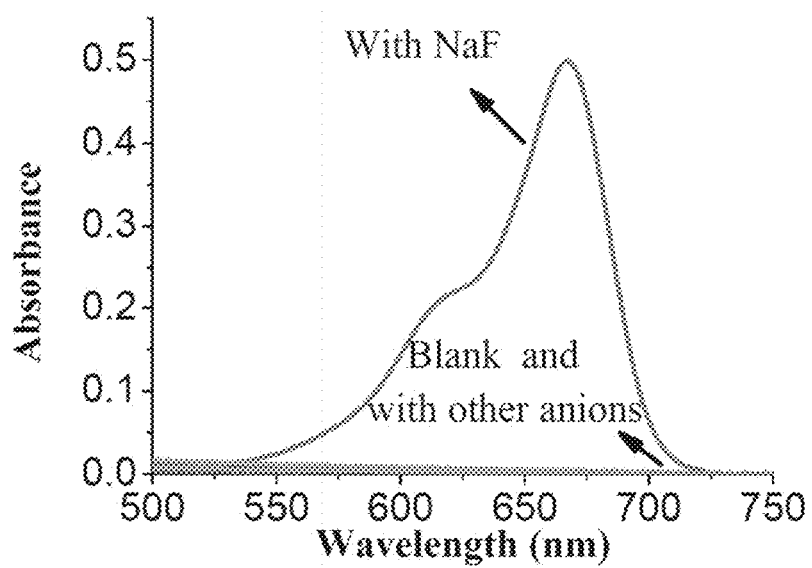
FIG. 4B shows absorption spectra of inventive compound R3 (10 μM) upon addition of 500 μM various tested samples ($F^-$, $CO_3^{2-}$, $PO_4^{3-}$, $H_2PO_4^-$, $NO_3^-$, $NO_2^-$, $SO_4^{2-}$, $SO_3^{2-}$, $S_2O_3^{2-}$, $CH_3COO^-$, $Cl^-$, $Br^-$, $I^-$, $N_3^-$, $SCN^-$, $C_2O_4^{2-}$, Bovine Serum Albumin (BSA)) (DMSO-HEPES solution (3/2, v/v, 10 mM HEPES, pH=7.2, λex=620 nm).

High-level selectivity is of paramount importance for an effective chemosensor. To this end, compound R3 has been measured for anion selectivity when reacted with different anions, such as $CO_3^{2-}$, $PO_4^{3-}$, $H_2PO_4^-$, $NO_3^-$, $NO_2^-$, $SO_4^{2-}$, $SO_3^{2-}$, $S_2O_3^{2-}$, $CH_3COO^-$, $Cl^-$, $Br^-$, $I^-$, $N_3^-$, $SCN^-$, $C_2O_4^{2-}$, BSA and F. FIGS. 4A and 4B show fluorescence spectra and absorption spectra, respectively, of inventive compound R3 (10 μM) upon addition of 500 μM various tested samples ($F^-$, $CO_3^{2-}$, $PO_4^{3-}$, $H_2PO_4^-$, $NO_3^-$, $NO_2^-$, $SO_4^{2-}$, $SO_3^{2-}$, $S_2O_3^{2-}$, $CH_3COO^-$, $Cl^-$, $Br^-$, $I^-$, $N_3^-$, $SCN^-$, $C_2O_4^{2-}$, BSA). Results reveal that only $F^-$ could cause drastic increase of both fluorescence intensity and absorbance with obvious color change. All the other anions cause almost no change on fluorescence or absorbance.

Selectivity to F− from Different Sources

Fluoride from different sources, e.g. inorganic fluoride or organic fluoride, may have quite different properties. Attempt to distinguish $F^-$ from different sources is made using R3. The fluorescence is measured for different fluoride sources (shown in Table 1 below) with R3 after different incubation time (e.g. 30 min, 60 min, or 120 min).

TABLE 1

| No. | 1 | 2 | 3 | 4 | 5 |
|---|---|---|---|---|---|
| F source | NaF | KF | CsF | TBAF | MFP (Na$_2$FPO$_3$) |

Figure 5:
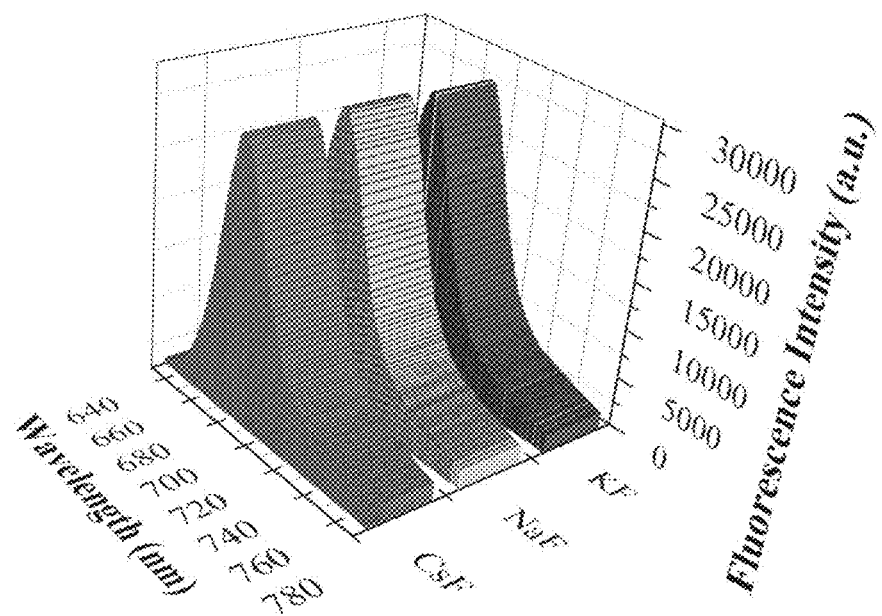
FIG. 5 shows fluorescence spectra of R3 (10 μM) after adding different inorganic fluoride KF, NaF, and CsF (500 μM) and incubated for 50 min (DMSO-HEPES solution (3/2, v/v, 10 mM HEPES, pH=7.2, λex=620 nm).
Figure 6:
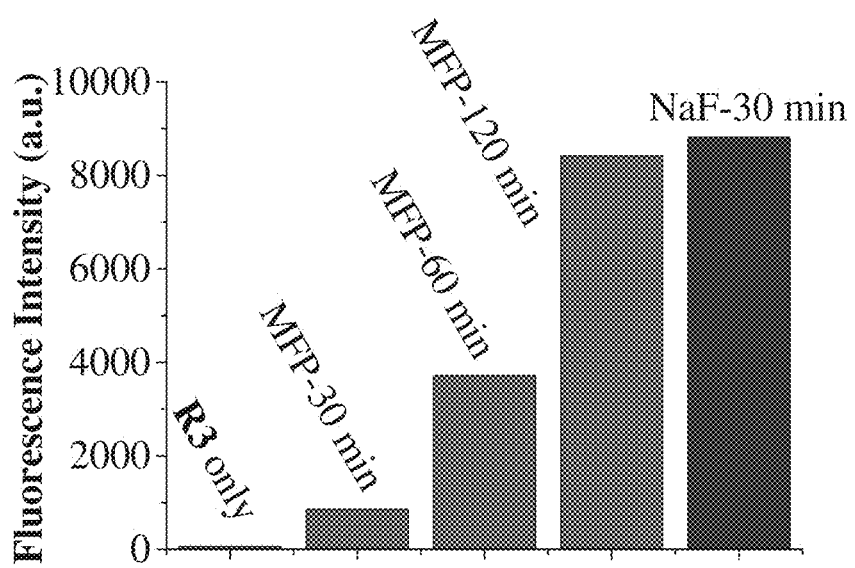
FIG. 6 shows fluorescence intensity of R3 (10 μM) at 690 nm with different incubation time after treated with MFP and incubated for 30 min after treated with NaF (DMSO-HEPES solution (3/2, v/v, 10 mM HEPES, pH=7.2, λex=620 nm).
Figure 7:
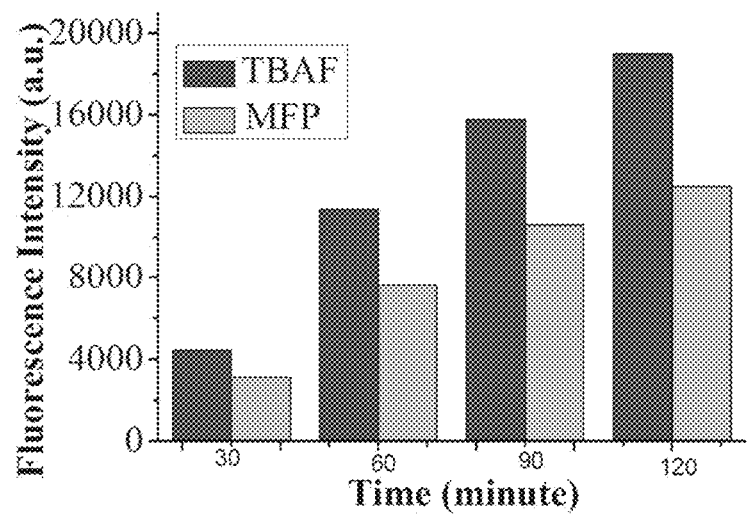
FIG. 7 shows fluorescence intensity of R3 (10 μM) with different incubation time after treated with MFP (500 μM) and TBAF (tetrabutylammonium fluoride) (500 μM) (DMSO-HEPES solution (3/2, v/v, 10 mM HEPES, pH=7.2, λex=620 nm).

FIG. 5 shows fluorescence spectra of R3 after adding different inorganic fluoride KF, NaF, and CsF (500 μM) and incubated for 50 min There are no significant differences on the fluorescent performance for different inorganic fluoride sources such as NaF, KF and CsF. FIG. 6 shows a comparison of fluorescence intensity of R3 at 690 nm with different incubation time after treated with MFP and incubated for 30 min after treated with NaF. It can be seen from FIG. 6 that the fluorescence intensity increases slowly for R3 treated with fluoride from MFP. The fluorescence intensity change induced by MFP is only 9.7% of that induced from NaF after both incubated for 30 min. Even after incubated for 120 min, the fluorescence intensity change for MFP is still smaller than that for NaF after incubated for 30 min. FIG. 7 shows a comparison of fluorescence intensity of R3 with different incubation time after treated with MFP and TBAF. It can be seen from FIG. 7 that R3 could distinguish MFP and TBAF, both belonging to organic fluoride. TBAF induces much more fluorescence intensity enhancement than that of MFP with the same reaction time. These data illustrate that R3 could not only detect $F^-$ but also identify $F^-$ from different sources.

Figure 8A:
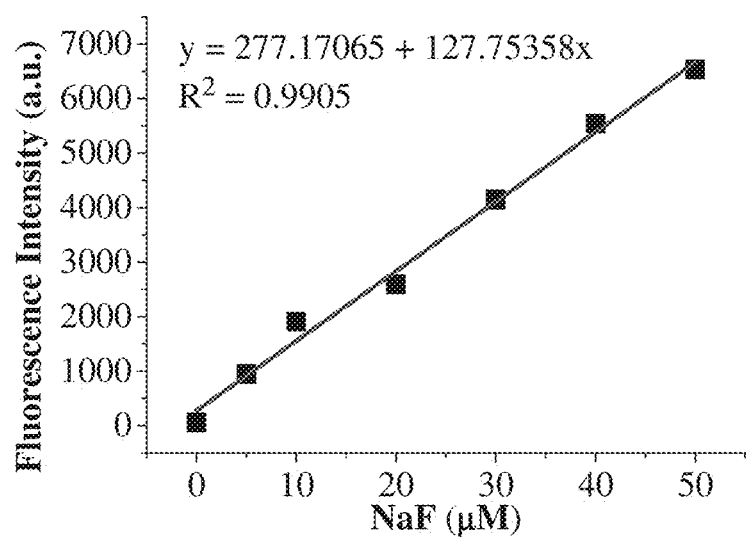
FIG. 8A shows fluorescence intensity of R3 (10 μM) at 690 nm with different concentration of NaF (incubated for 50 min, DMSO-HEPES solution (3/2, v/v, 10 mM HEPES, pH=7.2), λex=620 nm).
Figure 8B:
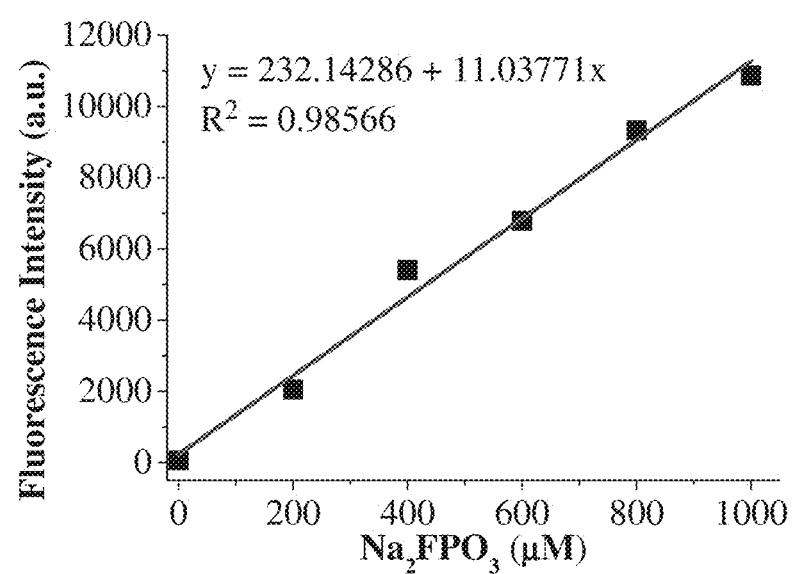
FIG. 8B shows fluorescence intensity of R3 (10 μM) at 690 nm with different concentration of MFP (incubated for 50 min, DMSO-HEPES solution (3/2, v/v, 10 mM HEPES, pH=7.2), λex=620 nm).

Additionally, FIGS. 8A and 8B show the relationship of fluorescence intensity of R3 with different concentrations of NaF and MFP respectively is studied. The concentration-dependent studies have found that R3 could quantitatively detect $F^-$ from different sources. Fluorescence intensity of R3 at 690 nm shows a good linear relationship with the concentration of NaF in the range of 0-50 μM (FIG. 8A) and MFP in the range of 0-1000 μM (FIG. 8B). The detection limit is calculated to be 0.11 μM for NaF and 1.23 μM for MFP. Therefore, R3 could also quantitative detection $F^-$ from different sources.

The application of R3 to determine $F^-$ content in toothpaste with different fluoride sources is further explored. The procedure for detecting fluoride ion in different toothpaste in an aqueous solution is described. Solutions of the fluoride ions (10.0 mM) are prepared from commercial-available toothpaste in distilled water. Those selected toothpastes are 15073007 (SENSODYNE); 61271864BC (Crest); 61061864BB (Oral-B). Toothpaste with different weights (Crest: 94.8 mg; SENSODYNE: 71.0 mg; Oral-B: 48.8 mg) are dispersed in 10 mL of distilled water. The obtained mixture is stirred at 70° C. for 3 h, and then filtered. The filtrate is used for the analysis of $F^-$. The test solution of R3 (10 μM) to $F^-$ from different toothpaste in 10 mM DMSO-HEPES solution (3/2, v/v, 10 mM HEPES, pH=7.2) is prepared by placing R3 stock solutions (100 μL) and different toothpaste stock solutions (Crest: 500 μL; SENSODYNE: 1000 μL; Oral-B: 500 μL) in 10-mL volumetric flask, diluting with buffer solution to volume, and mixing. The resulting solution is shaken well and incubated at room temperature before recording the spectra.

Table 2 shows the results of measured concentration of fluoride source in toothpaste using the proposed method of the present invention, i.e. based on the plots in FIGS. 8A and 8B, compared with calculation value based on annotated content on the packaging of the toothpaste. As a comparison, the fluoride concentration is also measured by test method FISE (detailed described in U.S. Environmental Protection Agency Website https://www.epa.gov/sites/production/files/2015-12/documents/9214.pdf). As shown in Table 2, when toothpaste using NaF as $F^-$ source, the measured concentration using R3 is close to the annotated content. While toothpaste using MFP as $F^-$ source, the measured content using R3 and traditional FISE method are both far lower than the annotated content, probably due to the delay release of fluoride ion from MFP.

TABLE 2

Measurement of F− from different toothpaste

| Sample | F− source | Proposed method (mg/L) | FISE (mg/L) | Calculated based on Annotated (mg/L) |
|---|---|---|---|---|
| Crest | NaF | 13.68 | 10.43 | 14.22 |
| Oral-B | NaF | 7.92 | 5.72 | 7.32 |
| SENSODYNE | MFP | 2.72 | 1.39 | 10.30 |

In summary, a series of desilylation-based fluorescent probes for $F^-$ in aqueous solution have been designed and synthesized, which can be visible to naked-eyes. The selected R3 exhibits high sensitivity, and selectivity for $F^-$ and can distinguish $F^-$ from NaF and MFP with low detection limit (NaF: 0.11 μM; MFP: 1.23 μM). In addition, it can determine F⁻ content in toothpaste with different F⁻ sources.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A compound selected from the group consisting of:
(i) 4-((tert-butyldiphenylsilyl)oxy)benzyl 3,7-bis(dimethylamino)-10H-phenothiazine-10-carboxylate;
(ii) 4-((triisopropylsilyl)oxy)benzyl 3,7-bis(dimethylamino)-10H-phenothiazine-10-carboxylate;
(iii) 4-((tert-butyldimethylsilyl)oxy)benzyl 3,7-bis(dimethylamino)-10H-phenothiazine-10-carboxylate;
(iv) 4-((trimethylsilyl)oxy)benzyl 3,7-bis(dimethylamino)-10H-phenothiazine-10-carboxylate;
(v) 4-((tri-tert-butylsilyl)oxy)benzyl 3,7-bis(dimethylamino)-10H-phenothiazine-10-carboxylate;
(vi) 4-((triethylsilyl)oxy)benzyl 3,7-bis(dimethylamino)-10H-phenothiazine-10-carboxylate;
(vii) 3,5-dimethyl-4-((trimethylsilyl)oxy)benzyl 3,7-bis(dimethylamino)-10H-phenothiazine-10-carboxylate;
(viii) 4-((triphenylsilyl)oxy)benzyl 3,7-bis(dimethylamino)-10H-phenothiazine-10-carboxylate;
(ix) 4-((methyldiphenylsilyl)oxy)benzyl 3,7-bis(dimethylamino)-10H-phenothiazine-10-carboxylate;
(x) 4-((diisopropyl(phenyl)silyl)oxy)benzyl 3,7-bis(dimethylamino)-10H-phenothiazine-10-carboxylate;
(xi) 3-((tert-butyldimethylsilyl)oxy)benzyl 3,7-bis(dimethylamino)-10H-phenothiazine-10-carboxylate;
(xii) 4-((tert-butyldiphenylsilyl)oxy)benzyl 3,7-bis(diethylamino)-10H-phenothiazine-10-carboxylate;
(xiii) 4-((tert-butyldiphenylsilyl)oxy)benzyl 3,7-bis(dimethylamino)-2,8-dimethyl-10H-phenothiazine-10-carboxylate;
(xiv) 4-((tert-butyldiphenylsilyl)oxy)benzyl 3,7-bis(ethylamino)-2,8-dimethyl-10H-phenothiazine-10-carboxylate;
(xv) 4-((tert-butyldiphenylsilyl)oxy)benzyl 3,7-di(pyrrolidin-1-yl)-10H-phenothiazine-10-carboxylate;
(xvi) 4-((tert-butyldiphenylsilyl)oxy)benzyl 3,7-di(piperidin-1-yl)-10H-phenothiazine-10-carboxylate;
(xvii) 4-((tert-butyldiphenylsilyl)oxy)benzyl 3,7-dimorpholino-10H-phenothiazine-10-carboxylate;
(xviii) 4-((tert-butyldiphenylsilyl)oxy)benzyl 3,7-bis(phenylamino)-10H-phenothiazine-10-carboxylate;
(xix) 4-((tert-butyldiphenylsilyl)oxy)benzyl 1,2,3,4,8,9,10,11-octahydro-6H-dipyrido[3,2-b:2',3'-i]phenothiazine-6-carboxylate;
(xx) 4-((tert-butyldiphenylsilyl)oxy)benzyl 5-methyl-1,2,3,4,10,11,12,13-octahydro-7H-dipyrido[2,3-c:3',2'-h]phenothiazine-7-carboxylate;
(xxi) 4-((triisopropylsilyl)oxy)benzyl 3,7-bis(diethylamino)-10H-phenothiazine-10-carboxylate;
(xxii) 4-((triisopropylsilyl)oxy)benzyl 3,7-bis(dimethylamino)-2,8-dimethyl-10H-phenothiazine-10-carboxylate;
(xxiii) 4-((triisopropylsilyl)oxy)benzyl 3,7-bis(ethylamino)-2,8-dimethyl-10H-phenothiazine-10-carboxylate;
(xxiv) 4-((triisopropylsilyl)oxy)benzyl 3,7-di(pyrrolidin-1-yl)-10H-phenothiazine-10-carboxylate;
(xxv) 4-((triisopropylsilyl)oxy)benzyl 3,7-di(piperidin-1-yl)-10H-phenothiazine-10-carboxylate;
(xxvi) 4-((triisopropylsilyl)oxy)benzyl 3,7-dimorpholino-10H-phenothiazine-10-carboxylate;
(xxvii) 4-((triisopropylsilyl)oxy)benzyl 3,7-bis(phenylamino)-10H-phenothiazine-10-carboxylate;
(xxviii) 4-((tert-butyldiisopropylsilyl)oxy)benzyl 1,2,3,4,8,9,10,11-octahydro-6H-dipyrido[3,2-b:2',3'-i]phenothiazine-6-carboxylate;
(xxix) 4-((tert-butyldiisopropylsilyl)oxy)benzyl 5-methyl-1,2,3,4,10,11,12,13-octahydro-7H-dipyrido[2,3-c:3',2'-h]phenothiazine-7-carboxylate;
(xxx) 4-((tert-butyldimethylsilyl)oxy)benzyl 3,7-bis(diethylamino)-10H-phenothiazine-10-carboxylate;
(xxxi) 4-((tert-butyldimethylsilyl)oxy)benzyl 3,7-bis(dimethylamino)-2,8-dimethyl-10H-phenothiazine-10-carboxylate;
(xxxii) 4-((tert-butyldimethylsilyl)oxy)benzyl 3,7-bis(ethylamino)-2,8-dimethyl-10H-phenothiazine-10-carboxylate;
(xxxiii) 4-((tert-butyldimethylsilyl)oxy)benzyl 3,7-di(pyrrolidin-1-yl)-10H-phenothiazine-10-carboxylate;
(xxxiv) 4-((tert-butyldimethylsilyl)oxy)benzyl 3,7-di(piperidin-1-yl)-10H-phenothiazine-10-carboxylate;
(xxxv) 4-((tert-butyldimethylsilyl)oxy)benzyl 3,7-dimorpholino-10H-phenothiazine-10-carboxylate;
(xxxvi) 4-((tert-butyldimethylsilyl)oxy)benzyl 3,7-dimorpholino-10H-phenothiazine-10-carboxylate;
(xxxvii) 4-((tert-butyldimethylsilyl)oxy)benzyl 1,2,3,4,8,9,10,11-octahydro-6H-dipyrido[3,2-b:2',3'-i]phenothiazine-6-carboxylate;
(xxxviii) 4-((tert-butyldimethylsilyl)oxy)benzyl 5-methyl-1,2,3,4,10,11,12,13-octahydro-7H-dipyrido[2,3-c:3',2'-h]phenothiazine-7-carboxylate;
(xxxix) 4-((tert-butyldimethylsilyl)oxy)benzyl 3,7-bis(dimethylamino)-10H-phenoxazine-10-carboxylate;
(xl) 3-((tert-butyldimethylsilyl)oxy)benzyl 3,7-bis(dimethylamino)-10H-phenothiazine-10-carboxylate; and
(xli) 4-((tert-butyldimethylsilyl)oxy)benzyl 2,8-bis(dimethylamino)-10-methylphenazine-5(10H)-carboxylate.

2. A method of detecting fluorine ion in a composition, the method comprising the steps of:
(a) incubating the composition with a compound according to claim 1;

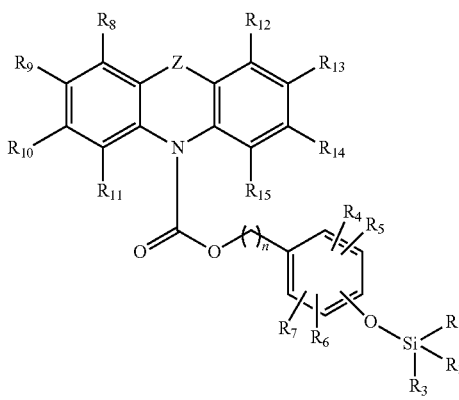

(b) shining excitation light to the incubated composition; and
(c) detecting light emission from the compound from 620 nm to 760 nm.

3. A method of quantitating fluorine ion in a biofilm, the method comprising the steps of:
(a) treating a biofilm with an oral care composition;
(b) labeling the treated biofilm with a compound according to claim 1;

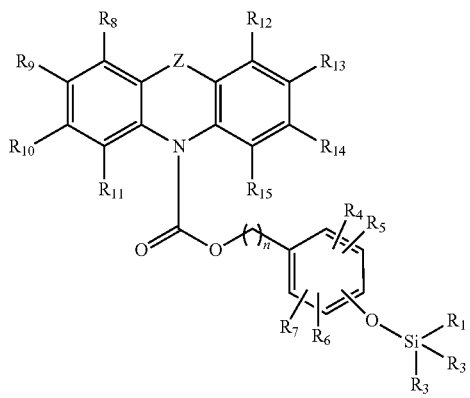

and
(c) quantitating the labeled fluorine by measuring fluorescence light emitted from the labeled fluorine.

* * * * *